(12) United States Patent
Neubauer et al.

(10) Patent No.: US 6,641,383 B1
(45) Date of Patent: Nov. 4, 2003

(54) DEVICE FOR THE PRODUCTION OF TUBES WITH TRANSVERSE WALLS

(75) Inventors: Gerhard Neubauer, Königsberg (DE); Edwin Neuberth, Trunstadt (DE)

(73) Assignee: Unicor GmbH Rahn Plastmaschinen, Hassfurt (DE)

( * ) Notice: Subject to any disclaimer, the term of this patent is extended or adjusted under 35 U.S.C. 154(b) by 226 days.

(21) Appl. No.: 09/958,250

(22) PCT Filed: Aug. 23, 2000

(86) PCT No.: PCT/DE00/02885

§ 371 (c)(1),
(2), (4) Date: Oct. 4, 2001

(87) PCT Pub. No.: WO01/23159

PCT Pub. Date: Apr. 5, 2001

(30) Foreign Application Priority Data

Sep. 29, 1999 (DE) .......................... 199 46 571

(51) Int. Cl.[7] .............................................. B29C 33/36
(52) U.S. Cl. ...................................... 425/183; 425/195
(58) Field of Search ................................ 425/183, 185, 425/195, 233, 336, 370, 396

(56) References Cited

U.S. PATENT DOCUMENTS 1,557,441 A * 10/1925 Ehrlich ........................ 425/185

| 3,430,292 A | | 3/1969 | Bauman et al. |
| 3,881,851 A | | 5/1975 | Allanic et al. |
| 4,519,762 A | * | 5/1985 | Ishihara et al. .............. 425/183 |
| 4,758,147 A | * | 7/1988 | Inaba ......................... 425/186 |
| 5,032,072 A | * | 7/1991 | Heuschkel ................... 425/150 |

FOREIGN PATENT DOCUMENTS

| DE | 195 35 231 | 3/1997 |
| DE | 199 14 974 | 10/2000 |
| DE | 200 07 270 | 10/2000 |
| EP | 0 048 113 | 3/1982 |
| EP | 0 270 694 | 11/1990 |
| EP | 0 628 397 | 12/1997 |
| WO | WO 91/06419 | 5/1991 |
| WO | WO 95/17295 | 6/1995 |

* cited by examiner

*Primary Examiner*—Patrick Ryan
*Assistant Examiner*—Gregg Cantelmo
(74) *Attorney, Agent, or Firm*—Bachman & LaPointe, P.C.

(57) ABSTRACT

There is described an apparatus (10) which is provided for the production of tubes with a transversely profiled wall. The apparatus (10) has shaping halves (16, 30) which move along two paths (14) closed in themselves and form a common shaping section (18) and two return sections (20). Provided at each of the two return sections (20) is a respective turning device (26) at which two shaping halves (16, 30) are disposed by means of a holding and release device (32). The one shaping half (30) has a socket contour in order to be able to produce transversely profiled tubes with sockets, with the apparatus (10).

3 Claims, 2 Drawing Sheets

DEVICE FOR THE PRODUCTION OF TUBES WITH TRANSVERSE WALLS

Figure 1:
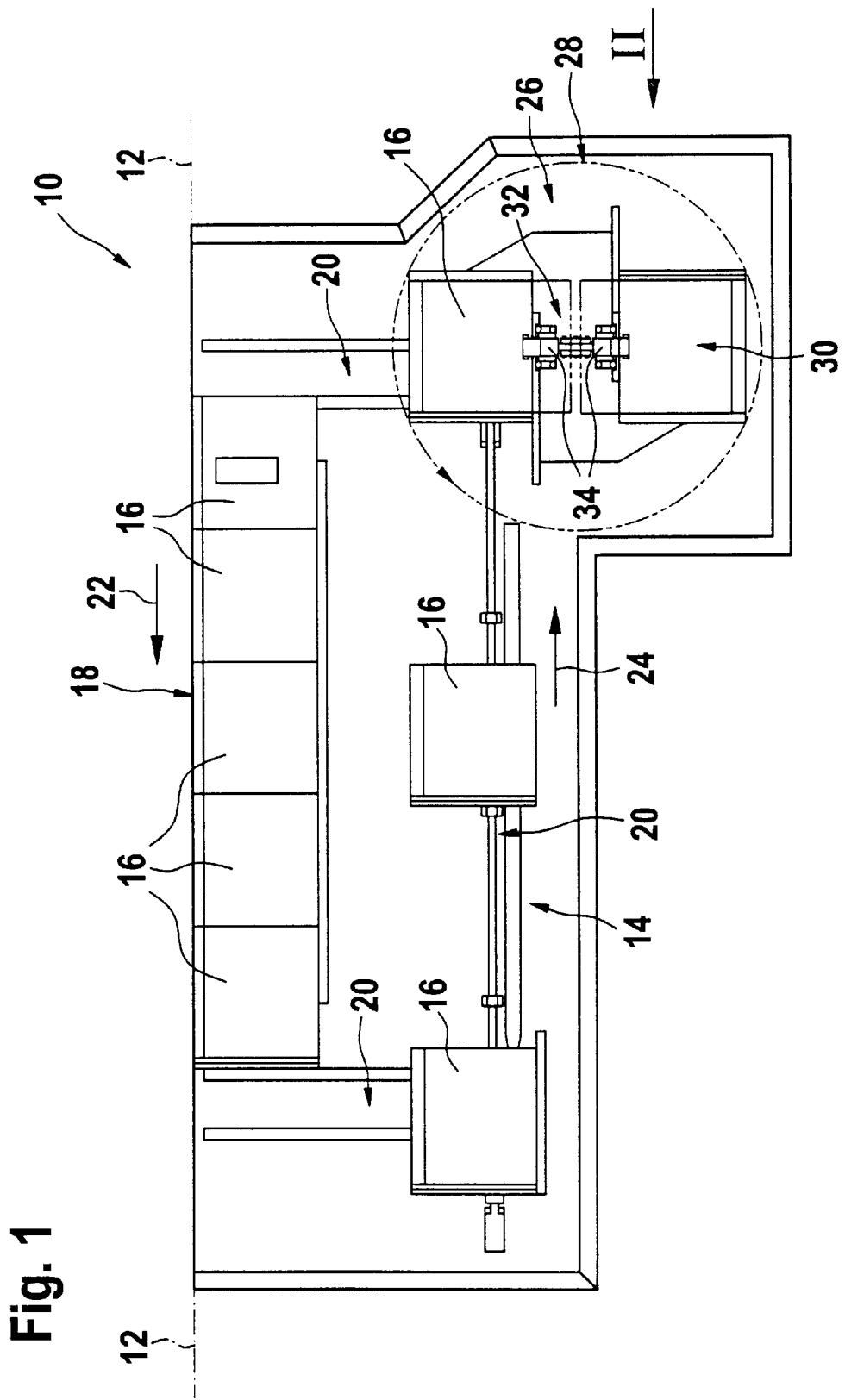

The invention concerns an apparatus for the production of tubes with a transversely profiled wall, comprising shaping halves which move along two paths closed in themselves and form a common shaping section and two return sections.

Apparatuses of that kind which are referred to as corrugators are known in a large number of different configurations. For example the applicants' EP 0 270 694 B1 describes such an apparatus which is referred to as a shuttle corrugator. Corrugators are also known for example from WO 95/17 295 A1, EP 0 048 113 A1, EP 0 628 397 B1, WO 91/06 419 A1 or DE 195 35 231 A1.

With such known apparatuses, it is possible to produce tubes having a transversely profiled wall and a connecting sleeve or socket if the apparatus has shaping halves corresponding to the connecting socket.

In the case of corrugators having shaping halves which are provided in two closed chains, the chain length determines the length of the tube portion, after which a respective connecting socket is produced.

In the case of shuttle corrugators in which the shaping halves do not move with a circulatory movement along two closed chains, there are a number of possible options for producing tubes with sockets. As the return motion of the shaping halves along the two return sections normally takes place faster than the actual tube production speed, that is to say the speed of advance movement of the shaping halves along the common shaping section, a shuttle corrugator—as is readily apparent—functions as long as at least the shaping section is filled with shaping halves. If now a connecting socket is to be produced at some point on the tube, that is to say if two socket shaping halves are to be introduced at some point, a parking station is required for that purpose. As shuttle corrugators normally involve corrugators for the production of tubes of large nominal widths which can be 500 mm or greater, the apparatus usually involves shaping halves which are of large volume and which are consequently relatively heavy in weight which have to be parked and moved. In that respect, the respectively parked shaping half is moved into the shaping section, that is to say into the path, which is closed in itself, of the respective shaping halves, while the shaping half which is no longer required is transported into the parking station which has then become free. That means that first the corresponding shaping half must be moved into the shaping section and that thereafter the shaping half which is no longer required is moved into the parking station which has become free. That operation requires a certain period of time, which has an effect on productivity of the apparatus because the production speed of such an apparatus is restricted by that manipulation of the shaping halves.

In consideration of those factors the object of the invention is to provide an apparatus of the kind set forth in the opening part of this specification in which an increase in the productivity of the apparatus goes along with a structurally simple design configuration.

In accordance with the invention, in an apparatus of the kind set forth in the opening part of this specification, that object is attained in that provided at each of the two return sections is a respective turning device at which two shaping halves are disposed by means of a holding and release device. In that respect, one of those two shaping halves involves a shaping half corresponding to the tube to be produced and the second shaping half preferably involves a socket shaping half.

By means of the apparatus according to the invention, it is possible with a high level of productivity to produce tubes with a transversely profiled wall and with a socket which is produced in an in-line mode of operation, wherein virtually any tube length with a socket can be implemented. By virtue of the arrangement of two shaping halves at an associated turning device, it is possible virtually without any delay for one shaping half or the other to be moved as desired into the associated shaping half path in order to produce transversely profiled tubes with sockets. A further advantage of the apparatus according to the invention is that from the point of view of control procedure it is also simple to operate with a turning device because the production procedure in the apparatus, that is to say in the common shaping section of the shaping halves, is in no way delayed by virtue of shifting a second shaping half in or out. There is no need to stop the shaping halves in the respective return section.

As has already been mentioned above, it is preferable if, in the case of the apparatus according to the invention, one of the shaping halves provided at the respective turning device has a socket contour, that is to say if that shaping half involves a socket shaping half of the above-indicated kind.

The respective turning device may desirably have a turntable. When using a turntable, the holding and release device is desirably such or so designed that, during the turning movement of the turntable, the two shaping halves disposed thereon are fixed to the turntable, that is to say locked thereto. In the respective parking position of the turntable, it is then only the shaping half that is outside the associated return section, which is locked to the turntable, while the other shaping half which is disposed in the return section is released in order to take part in the production procedure. This mode of operation of the holding and release device can be structurally easily automated.

Figure 2:
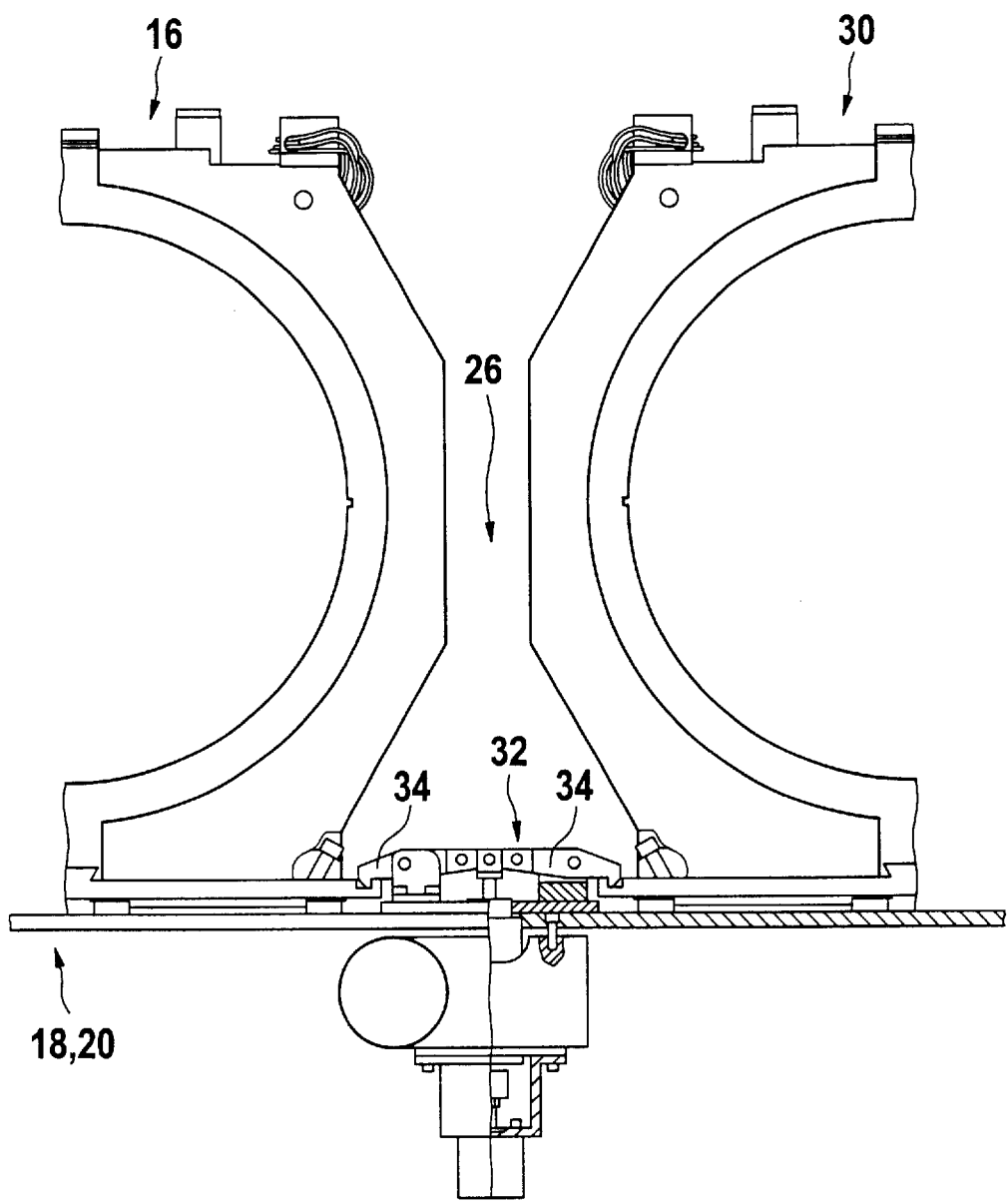

Further details, features and advantages will be apparent from the description hereinafter of an embodiment illustrated in the drawing of the apparatus according to the invention for the production of tubes with a transversely profiled wall and with a socket. In the drawing:

FIG. 1 is a plan view showing one half of the apparatus forming a shuttle corrugator, and FIG. 2 is a view of the turning device of the apparatus illustrated in FIG. 1 viewing in the direction of the arrow II, that is to say as a side view.

FIG. 1 shows one half of an apparatus 10 which is in the form of a shuttle corrugator and which is provided for the production of tubes with a transversely profiled wall and with a connecting socket. In this case, FIG. 1 shows only one half of the apparatus 10. A second half is provided in mirror image relationship in relation to the dash-dotted line 12, with respect to the half shown in FIG. 1. FIG. 1 therefore shows only one of the two paths 14 of the apparatus 10, which are closed in themselves and along which the shaping halves 16 move. The two paths of movement 14 of the shaping halves 16 form a common shaping section 18 along the dash-dotted line 12. The shaping halves 16 bear snugly against each other along the common shaping section 18. Along each of the two return sections 20, the shaping halves 16 are at a spacing from each other, which means that the shaping halves 16 are moved along the respective return section 20 at a greater speed than along the common shaping section 18. The advance movement of the shaping halves 16 along the common shaping section 18 (=production speed) is indicated by the arrow 22. The return movement of the shaping halves 16 along the return section 20 is indicated by the arrow 24.

Provided at each of the two return sections 20—of which only one is shown in FIG. 1—is a turning device 26 which can have a turntable corresponding approximately to the circular surface indicated in dash-dotted line in FIG. 1 by the arrow 28. Disposed at the turning device 26 is a tube shaping half 16 and also a socket shaping half 30, which are detachably mounted to the turning device 26 by means of a holding and release device 32, as can also be seen from FIG. 2. As already mentioned above, the shaping half 30 is a socket shaping half. When the tube shaping half 16 is pivoted out of the return section 20 by means of the turning device 26 and at the same time the socket shaping half 30 is pivoted into the return section 20, which is indicated by the arcuate arrow 34, then immediately subsequently thereto the socket shaping half 30 is transported into the common shaping section 18 of the apparatus 10 in order to produce a transversely profiled tube having a socket.

During the pivotal movement of the turning device 26 in the direction of the arcuate arrow 28 of he two shaping halves 16 and 30 provided at the turning device 26 are held fast by means of claws 36. Then only the shaping half which is outside the return section 20 is fixed in the parking station by means of the corresponding claw 36. The claw 36 associated with the return section 20 is displaced automatically from the holding position into the release position in order to be able to transport said shaping half 16 and 30 respectively into the return section 20 and from there to the common shaping section 18.

What is claimed is:

1. An apparatus for the production of tubes with a transversely profiled wall, comprising shaping halves (16, 30) which move along two paths (14) closed in themselves and form a common shaping section (18) and two return sections (20), characterized in that provided at each of the two return sections (20) is a respective turning device (26) at which two shaping halves (16, 30) are disposed by means of a holding and release device (32).

2. Apparatus as set forth in claim 1 characterized in that one of the shaping halves (30) provided at the respective turning device (26) has a socket contour.

3. Apparatus as set forth in claim 1 characterised in that the respective turning device (26) has a turnable.

* * * * *